(12) United States Patent
Shaw et al.

(10) Patent No.: US 8,665,915 B2
(45) Date of Patent: Mar. 4, 2014

(54) MID-IR FIBER LASER APPARATUS

(75) Inventors: Leslie Brandon Shaw, Woodbridge, VA (US); Jasbinder S. Sanghera, Ashburn, VA (US); Shyam S. Bayya, Ashburn, VA (US); Ishwar D. Aggarwal, Fairfax Station, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 111 days.

(21) Appl. No.: 13/249,325

(22) Filed: Sep. 30, 2011

(65) Prior Publication Data

US 2013/0083812 A1    Apr. 4, 2013

(51) Int. Cl.
*H01S 3/30* (2006.01)

(52) U.S. Cl.
USPC ............... 372/6; 372/50.11; 372/69; 372/92; 372/102

(58) Field of Classification Search
USPC ..................... 372/6, 50.11, 69, 92
See application file for complete search history.

(56) References Cited

U.S. PATENT DOCUMENTS

| 2008/0219298 A1* | 9/2008 | Ahn et al. ............. 372/6 |
| 2011/0097581 A1* | 4/2011 | Deng et al. ............ 428/374 |
| 2011/0222573 A1* | 9/2011 | Hann et al. ........... 372/70 |

* cited by examiner

*Primary Examiner* — Dung Nguyen
(74) *Attorney, Agent, or Firm* — US Naval Research Laboratory; Rebecca L. Forman

(57) ABSTRACT

A laser apparatus uses a dysprosium doped chalcogenide glass fiber. The glass fiber has a laser pump operatively connected to it. The chalcogenide glass fiber is located in a laser cavity including one or more reflective elements such as a Bragg grating, a Bragg minor, a grating, and a non-doped fiber end face. The apparatus provides laser light output at a wavelength of about 4.3 μm to about 5.0 μm at a useful power level using laser light input at a wavelength of from about 1.7 μm to about 1.8 μm. Also disclosed is a method for providing laser light output at a wavelength of about 4.3 μm to about 5.0 μm using the apparatus of the invention.

18 Claims, 4 Drawing Sheets

MID-IR FIBER LASER APPARATUS

BACKGROUND OF THE INVENTION

1. Field of the Invention

The present invention is in the field of lasers. In particular the invention is in the field of fibers that function in the mid-IR range.

2. Description of the Related Technology

In the mid-IR range of the optical spectrum, in particular within the 3.0 μm to 5.0 μm wavelength region of the optical spectrum, there are possible applications in remote sensing and environmental monitoring, for example.

In the past, rare earth doped chalcogenide fibers have been shown to be strong emitters of mid-IR radiation. The phonon energy of chalcogenide glasses is within the range of 200-350 $cm^{-1}$, which is low when compared to fluoride fiber, which has a phonon energy of ~560 $cm^{-1}$ and silica fiber, which has a phonon energy of ~1100 $cm^{-1}$. The low phonon energy allows many transitions to occur which are typically quenched in fluoride and silica fiber. To date, however, laser action in these materials has only been demonstrated in the near-IR at wavelengths of 1 μm. Much spectroscopy has been done to assess whether the fibers are viable for development of lasers and amplifiers in the mid-IR wavelengths. While the spectroscopy indicates that the materials show promise, a product that uses practical pumping schemes, has good cavity characteristics and laser dynamics has not yet been effectively created.

Therefore there is a need for a laser apparatus that uses a fiber and is able to effectively use the 4.5 μm to 5.0 μm wavelength region of the optical spectrum in order to create is an efficient, compact and rugged light source for this spectral region.

SUMMARY OF THE INVENTION

In one aspect, the invention is a laser apparatus that uses a dysprosium doped glass fiber.

In another aspect, the invention is a laser apparatus that uses a chalcogenide glass fiber.

In still another aspect, the invention is a laser apparatus that functions in the mid-IR wavelength range.

In yet another aspect, the invention is a method of producing a laser output in the mid-IR wavelength range.

A first aspect of the invention may be a laser apparatus comprising a laser pump; a chalcogenide glass fiber doped with dysprosium operatively connected to the laser pump and located within a suitable laser cavity including a non-doped fiber portion including a Bragg grating or a Bragg mirror.

Another aspect of the invention may be a method for producing a laser output comprising the steps of pumping a chalcogenide glass fiber doped with dysprosium and provided with a laser cavity, wherein the laser cavity includes a non-doped fiber portion including a Bragg grating or a Bragg mirror, with a laser to produce an output.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
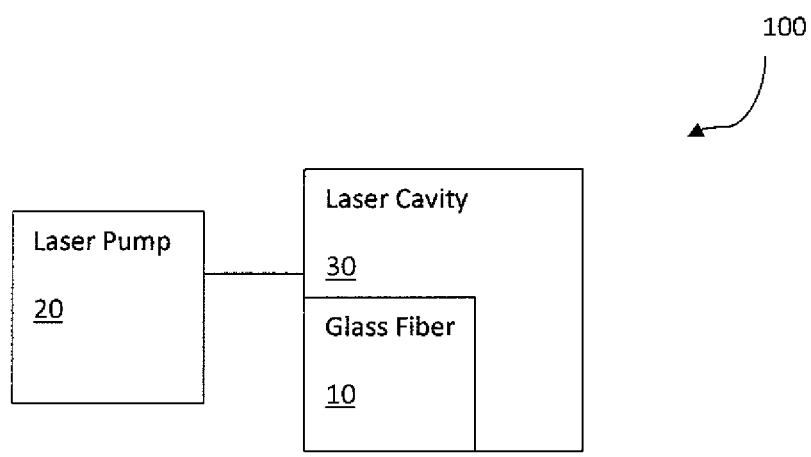
FIG. 1 is a schematic diagram showing the laser apparatus, in accordance with an embodiment of the invention.

In FIG. 1 a schematic diagram is shown illustrating the general structure of the laser apparatus 100. This present invention may comprise a mid-IR laser 20 that uses a chalcogenide glass fiber 10 that is doped with dysprosium ions. The dysprosium-doped chalcogenide glass fiber 10 produces an output at a wavelength of from about 4.3 μm to about 5.0 μm when pumped with laser light at a wavelength of from about 1.7 μm to about 1.8 μm.

The laser apparatus 100 uses a glass fiber 10. Preferably, in the present invention, a chalcogenide glass fiber 10 is used that is doped with dysprosium, and preferably doped with $Dy^{3+}$ ions. The glass fiber 10 may also contain other rare earth ions such as $Pr^{3+}$, $Tb^{3+}$, and their mixtures. Chalcogenide is a chemical compound consisting of at least one chalcogen ion, such as oxygen, sulfur, selenium, tellurium, and at least one more electropositive element. Dopant concentration of $Dy^{3+}$ can range from 100 ppm to 30,000 ppm or more.

A preferred composition of the chalcogenide glass fiber 10 is germanium Arsenic selenide glass (GeAsSe). The glass fiber 10 may also contain gallium in order to enable the incorporation of rare earth elements into the matrix. Typically, the gallium ratio is 5 to 10 times the $Dy^{3+}$ concentration to create a site for incorporating the $Dy^{3+}$. The chalcogenide glass fiber 10 may transmit in the mid infrared range of wavelengths of from about 3.0 μm to about 5.0 μm. The phonon energy of the glass fiber 10 is preferably less than 400 $cm^{-1}$, and preferably 200 to 400 $cm^{-1}$.

The laser apparatus 100 also may comprise a laser pump 20 which is operatively connected to the glass fiber 10. In an embodiment of the present invention, the $Dy^{3+}$ doped glass fiber 10 may be pumped by a laser pump 20 with laser light having a wavelength of from about 1.7 μm to about 1.8 μm, which then excites the ions from the ground state $^6H_{15/2}$ to the $^6H_{11/2}$ state of $Dy^{3+}$. The laser pump 20 may be, for example, a laser diode, fiber laser or solid state laser.

Also present in the laser apparatus 100 may be a laser cavity 30 that is operatively connected to the glass fiber 10 and the laser pump 20. The $Dy^{3+}$ doped glass fiber 10 is used with a laser cavity 30. A laser cavity 30 functions so that the laser radiation can circulate and pass a gain medium. In this case, the gain medium is the $Dy^{3+}$ doped glass fiber.

The laser cavity 30 may be formed using one or more reflective structures such as Bragg gratings, Bragg mirrors, gratings, or the fiber endfaces. A Bragg mirror is a quarter-wave mirror, which is a dielectric mirror structure consisting of an alternating sequence of layers of two different optical materials, with each optical layer thickness corresponding to one-quarter of the wavelength for which the mirror is designed. For a given wavelength and number of layer pairs, a quarter-wave minor is the structure which can result in the highest reflectivity. Gratings can also be used as the reflective element. In this case, changing the angle of the grating can change the wavelength being reflected back into the cavity and allow tuning the wavelength of the laser. More than one reflective structure may be used. For example, if a Bragg grating is used in the fiber, a non-doped portion of the fiber may also be used.

The laser cavity 30 preferably has a high reflection of 90-100% at one end of the cavity at the chosen laser wavelength, which in an embodiment disclosed herein, is preferably from about 4.3 µm to about 5.0 µm. The laser cavity 30 also preferably has a high transmission of 90-100% at the pump wavelength of from about 1.7 µm to about 1.8 µm. The laser cavity 30 allows a portion of the 4.3 µm to 5.0 µm wavelength laser output in the cavity to be coupled out of the glass fiber 10. This is achieved by a partial reflector at the other end of the laser cavity.

Figure 2:
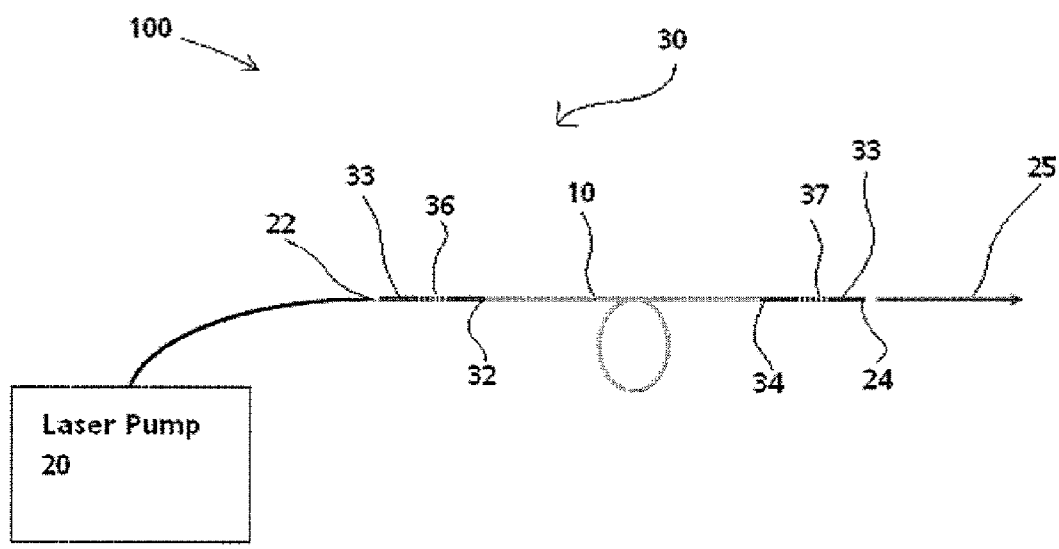
FIG. 2 is schematic diagram of a $Dy^{3+}$ doped chalcogenide fiber laser operating at a wavelength of 4.7 μm, in accordance with an embodiment of the invention.

An example of an embodiment of a laser apparatus 100 in accordance with the present invention is shown in FIG. 2, wherein a schematic $Dy^{3+}$ doped chalcogenide fiber laser 20 operating at 4.7 µm is shown.

In FIG. 2, a 20 meter long $Dy^{3+}$ doped germanium arsenic gallium selenide (GeAsGaSe) glass fiber 10 is provided that has a fiber core area of $8 \times 10^{-7}$ cm$^2$. The laser apparatus 100 operates with a loss of 0.1 to 1 dB/m. A dopant concentration of $5 \times 10^{19}$ cm$^{-3}$ is placed in a laser cavity 30 which comprises the doped $Dy^{3+}$ GeAsGaSe fiber having two non-doped fiber portions 33, which may be made of GeAsSe, attached to each end of the glass fiber 10 and containing Bragg gratings 36 and 37.

In forming the laser cavity 30, a non-doped fiber portion 33 may be fusion spliced at location 32, which is located prior to the $Dy^{3+}$ doped fiber 10, in the transmission direction of the laser, and another non-doped fiber portion 33 portion may be fusion spliced at location 34 which is located after the $Dy^{3+}$ doped fiber 10 and prior to the output, along the direction of the transmission of the laser. The fiber portions 33 preferably have a Bragg grating written into the fiber and can be made from an arsenic selenide (AsSe) fiber or a germanium arsenic selenide (GeAsSe) fiber.

The glass fiber 10 is pumped via the laser pump 20 with laser light at 1.75 µm wavelength. From the laser pump 20 the laser light enters the input 22 and passes through the input Bragg grating 36. The input Bragg grating 36 preferably has a reflectivity of ≥99% at a wavelength of 4.4 µm and has a high transmission at the pump wavelength of 1.75 µm. The output Bragg grating 37 has a reflection greater than 15% at a 4.4 µm wavelength. After passing through and exiting the output Bragg grating 37 the laser light 25 is emitted from the output 24.

Figure 3:
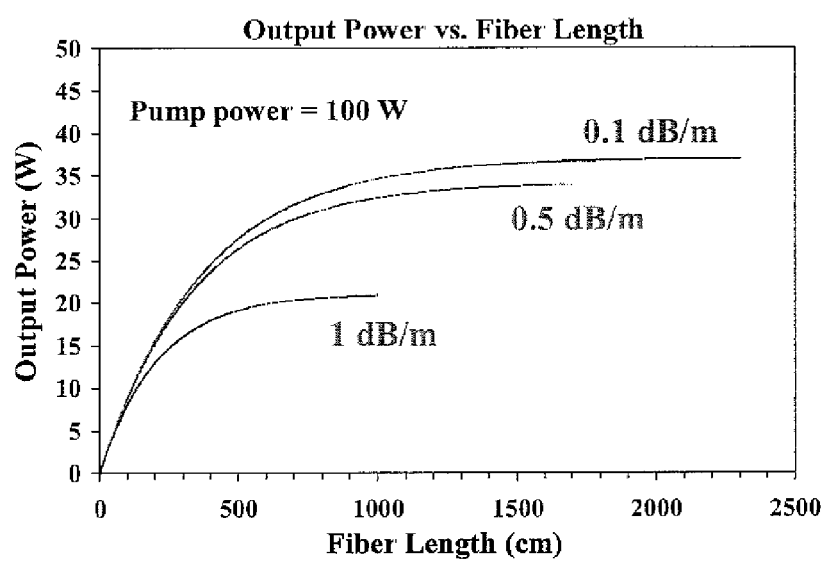
FIG. 3 is a graph showing the output power as a function of fiber length for $Dy^{3+}$ doped fiber laser operating at a wavelength of 4.4 μm when pumped by a laser at a wavelength of 1.75 μm.

FIG. 3 shows the modeled results of the laser output vs. pump wavelength. For the 20 meter long length of the glass fiber 10, using a laser pump 20 with a power of 100 W and a fiber loss of 0.1 dB/m, the laser apparatus 100 can emit >35 W of power at a wavelength of 4.4 µm.

Figure 4:
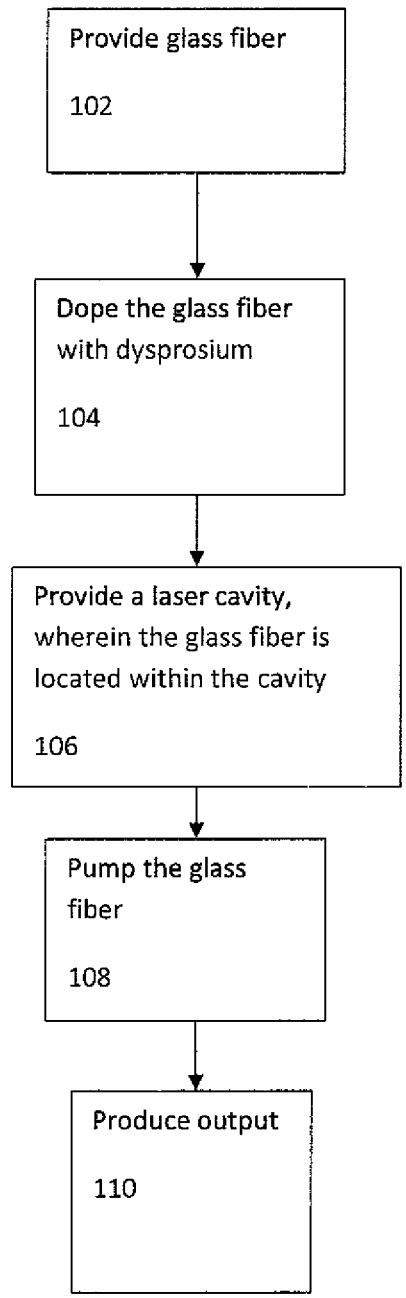
FIG. 4 is a flow chart showing a method for producing laser output in accordance with the present invention.

FIG. 4 is a flow chart of the steps taken in the construction of the laser apparatus 100. In step 102 a chalcogenide glass fiber 10 is provided. In step 104, the chalcogenide glass fiber 10 is doped with dysprosium. In step 106 the doped glass fiber 10 is located in the laser cavity 30. Preferably, the glass fiber 10 is formed using two non-doped fiber portions 33, made of GeAsSe, that are fusion spliced to the glass fiber 10. As discussed above, the non-doped fiber portions 33 preferably have Bragg gratings written into them. In step 108 the glass fiber 10 is pumped via the laser pump 20 to an acceptable range. In step 110 the output laser light 25 is produced.

The laser apparatus 100 described above permits compact direct pump lasers in the mid-IR at wavelengths of 4.3 µm and beyond. The laser apparatus 100 of the present invention may be pumped by easily obtainable near-IR diode lasers or fiber lasers.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A laser apparatus comprising:
    a laser pump;
    a chalcogenide glass fiber doped with dysprosium located in a laser cavity, wherein said laser cavity comprises one or more reflective elements selected from the group comprising a Bragg grating, a Bragg mirror, a grating, and a non-doped fiber portion;
    wherein the chalcogenide fiber transmits light at a single wavelength from about 4.3 µm to about 5.0 µm.

2. The laser apparatus of claim 1, wherein the chalcogenide glass fiber comprises a material selected from the group consisting of sulfur, selenium and tellurium.

3. The laser apparatus of claim 1, wherein the chalcogenide glass fiber comprises germanium arsenic selenide.

4. The laser apparatus of claim 1, wherein the chalcogenide glass fiber comprises germanium arsenic gallium selenide.

5. The laser apparatus of claim 1, wherein the dopant is $Dy^{3+}$.

6. The laser apparatus of claim 1, wherein the non-doped fiber portion comprises a material selected from the group consisting of arsenic selenide and germanium arsenic selenide.

7. The laser apparatus of claim 1, wherein the reflective element has a reflectivity greater than or equal to 99% at a wavelength of 4.4 µm.

8. The laser apparatus of claim 1, wherein the laser cavity comprises a second reflective element having a reflectivity greater than or equal to 5% at a wavelength of 4.4 µm.

9. The laser apparatus of claim 1, wherein the laser pump provides laser light at a wavelength of from about 1.7 µm to about 1.8 µm.

10. The laser apparatus of claim 1, wherein the laser cavity comprises two reflective elements located at opposite ends of the chalcogenide fiber.

11. A method for producing a laser output at a wavelength of from about 4.3 µm to about 5.0 µm comprising the step of:
    pumping, with laser light at a wavelength of from about 1.7 µm to about 1.8 µm, a dysprosium-doped chalcogenide glass fiber located in a laser cavity comprising one or more reflective elements selected from the group comprising a Bragg grating, a Bragg mirror, a grating, and a non-doped fiber portion.

12. The method of claim 11, wherein the chalcogenide glass fiber comprises a material selected from the group consisting of sulfur, selenium and tellurium.

13. The method of claim 11, wherein the chalcogenide glass fiber comprises germanium arsenic selenide.

14. The method of claim 11, wherein the chalcogenide glass fiber comprises germanium arsenic gallium selenide.

15. The method of claim 11, wherein the dysprosium is $Dy^{3+}$.

16. The method of claim 11, wherein the non-doped fiber portion comprises a material selected from the group consisting of arsenic selenide and germanium arsenic selenide.

17. The method of claim 11, wherein the reflective element has a reflectivity greater than or equal to 99% at a wavelength of 4.4 µm.

18. The method of claim 11, wherein the laser cavity further comprises a second reflective element having a reflectivity greater than or equal to 5% at a wavelength of 4.4 μm.

\* \* \* \* \*